(12) United States Patent  
Strollo

(10) Patent No.: US 8,439,209 B2  
(45) Date of Patent: May 14, 2013

(54) BACKBOARD CONTAINER STORAGE SYSTEM

(76) Inventor: Giacomo Michael Pasquale Strollo, San Diego, CA (US)

( * ) Notice: Subject to any disclaimer, the term of this patent is extended or adjusted under 35 U.S.C. 154(b) by 147 days.

(21) Appl. No.: 13/072,541

(22) Filed: Mar. 25, 2011

(65) Prior Publication Data

US 2012/0241397 A1 Sep. 27, 2012

(51) Int. Cl.
*A47B 73/00* (2006.01)
*A47F 7/283* (2006.01)
*A47F 5/0807* (2006.01)
*A47F 5/0823* (2006.01)
*A47G 23/0266* (2006.01)
*A47F 7/28* (2006.01)
*A47G 23/02* (2006.01)

(52) U.S. Cl.
USPC .......................... 211/75; 211/87.01

(58) Field of Classification Search .................... 211/74, 211/75, 792, 87.01, 72, 71.01, 86.01, 76, 211/13.1, 85.18, 85.17, 85.5, 192; 248/309.1, 248/310, 311.2, 311.3, 314
See application file for complete search history.

(56) References Cited

U.S. PATENT DOCUMENTS

| 1,751,463 | A | * | 3/1930 | Backus et al. | 224/559 |
|---|---|---|---|---|---|
| 2,557,801 | A | * | 6/1951 | Shapiro | 211/75 |
| 2,902,191 | A | | 9/1959 | Rhodes | |
| 3,613,958 | A | | 10/1971 | Opp | |
| 3,650,381 | A | * | 3/1972 | Weindling | 206/742 |
| 3,921,948 | A | | 11/1975 | Long | |
| 4,068,760 | A | | 1/1978 | Johnson | |
| 4,106,629 | A | | 8/1978 | Doyle | |
| 4,339,102 | A | | 7/1982 | Schweitzer | |
| 4,378,889 | A | * | 4/1983 | Lebowitz | 211/75 |
| 4,405,108 | A | * | 9/1983 | Muirhead | 248/309.4 |
| 4,750,700 | A | | 6/1988 | Wade | |
| 5,397,006 | A | * | 3/1995 | Terrell | 211/88.01 |
| 5,582,302 | A | | 12/1996 | Kozak | |
| 5,655,673 | A | * | 8/1997 | Weterrings et al. | 211/75 |
| 5,664,690 | A | | 9/1997 | Friesen | |
| 6,274,092 | B1 | * | 8/2001 | Itoh | 422/562 |
| 6,443,316 | B1 | * | 9/2002 | Mao | 211/74 |
| 6,964,343 | B2 | * | 11/2005 | Tilly | 211/74 |
| 7,232,039 | B2 | | 6/2007 | Doran | |
| 7,506,771 | B2 | * | 3/2009 | Bianchini | 211/75 |
| 7,533,776 | B2 | * | 5/2009 | Nickerson | 211/94.01 |
| 7,757,868 | B2 | * | 7/2010 | Bianchini | 211/75 |
| 8,127,941 | B2 | * | 3/2012 | Smith et al. | 211/26.2 |
| 2010/0090078 | A1 | | 4/2010 | Vanek | |

\* cited by examiner

*Primary Examiner* — Jennifer E Novosad
(74) *Attorney, Agent, or Firm* — Harry V. McGahey, Esq.; McGahey & McGahey, APLC

(57) ABSTRACT

A user configurable container storage system using movable container-nest modules securely anchored to a backing allowing removal and insertion of the containers with one hand.

23 Claims, 7 Drawing Sheets

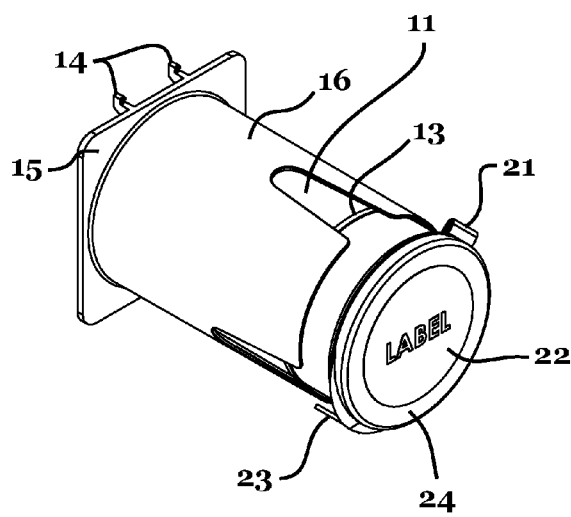
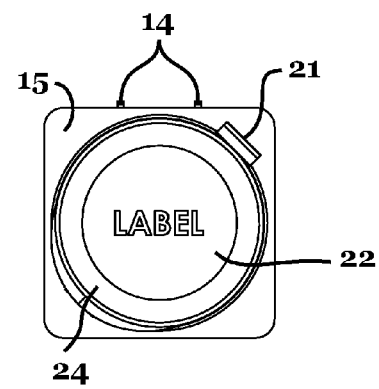
Fig. 3
Fig. 4
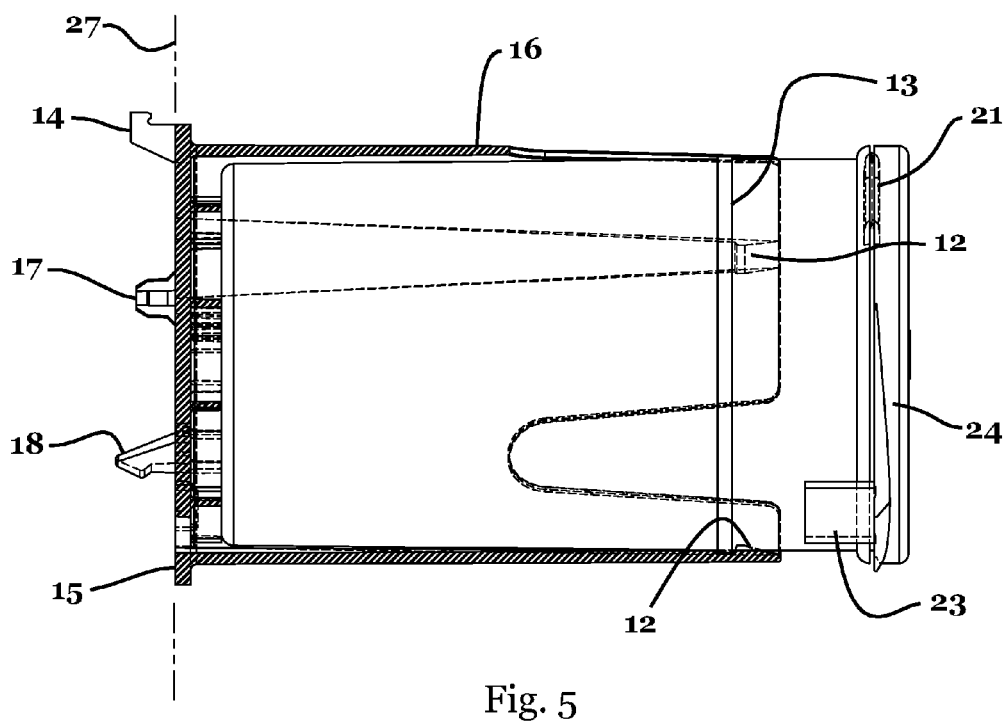
Fig. 5

BACKBOARD CONTAINER STORAGE SYSTEM

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

Pegboard based and similar types of backboard or backing based storage systems are handy and inexpensive ways to store small items and various liquids. Many different storage systems for small items and liquids have been patented, some using backings like pegboard and some not. Examples of related technology include: U.S. Patent Application 20010090078 filed Apr. 15, 2010; U.S. Pat. No. 7,232,029 issued Jun. 19, 2007 filed by Doran; U.S. Pat. No. 6,964,343 issued Nov. 15, 2005 filed by Tilly; U.S. Pat. No. 5.664.690 issued Sep. 9, 1987 filed by Friesen; U.S. Pat. No. 5,582,302 issued Dec. 10, 1996 filed by Kozak; U.S. Pat. No. 4,750,700 issued Jun. 14, 1988 filed by Wade; U.S. Pat. No. 4,339,102 issued Jul. 13, 1982 filed by Schweitzer; U.S. Pat. No. 4,106,629 issued Aug. 15, 1978 filed by Doyle; U.S. Pat. No. 4,068,760 issued Jan. 17, 1978 filed by Johnson; U.S. Pat. No. 3,921,948 issued Nov. 25, 1975 filed by Long; U.S. Pat. No. 3,613,958 issued Oct. 19, 1971 filed by Opp; U.S. Pat. No. 2,902,191 issued Sep. 1, 1959 filed by Rhodes; U.S. Pat. No. 4,378,889 issued Apr. 5, 1983 Lebowitz.

BRIEF SUMMARY OF THE INVENTION

The primary object of the invention is to provide a better container sorting and storage system which can mount on a backing such as pegboard with openings in it through which barbs or pegs can be inserted. Although the words "backing" and "pegboard" are used throughout this specification, it is to be understood that the term "backing" need not specifically be a "pegboard", but may also be any suitable backing having the necessary openings.

Yet another object of the invention is to provide an improved mounting method which more firmly attaches a container to pegboard or other suitable backing.

Another object of the invention is to provide an improved design for the attaching elements of a container sorting and storage system which can mount on pegboard or other suitable backing.

Yet another object of the invention is to provide an improved method of mounting containers on pegboard or a backing which allows the container to be removed from its nest easily without having to open the container.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a user configurable container storage system array comprised of a plurality of movable container-nest modules anchored to a pegboard, backboard or other type of compatible backing, each container-nest module comprised of a mounting flange having a front and a back side, a container nest being anchored to the front side of the mounting flange at one end and open at the other end, a plurality of container catch snaps at the open end of the container nest, the mounting flange anchored to the container nest on the front side, the mounting flange having two retention barbs (or similar backing retention barbs) near the bottom of the mounting flange. The mounting flange has a plurality of retention hooks on the back side near the opposite edge of the mounting flange spaced at positions that allow the retention hooks to fit into matching openings on the backing. The mounting flange also has a plurality of retention hooks on the back side near the opposite edge of the mounting flange spaced at positions that allow the retention hooks to fit into matching openings on the backing; These openings are spaced at positions that allows them to fit into matching openings. In this embodiment shown, there are two shear load support posts near the middle of the mounting flange spaced at positions that allow them to fit into matching openings, and two retention hooks near the top of the mounting flange spaced at positions that allow them to fit into matching openings, a container, a container catch rib projecting outward from the center around the full circumference of the container, the container catch rib positioned so that it will engage the plurality of container catch snaps at the open end of the container nest, a lid for the container, a means for anchoring the lid by a hinge, and a means to latch the lid to seal the container. This summary is provided merely to introduce certain concepts and not to identify any key or essential features of the claimed subject matter.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 is a perspective view of one embodiment of a container seated in its nest which has been removed from the array.

FIG. 4 is an elevational view of one embodiment of a container seated in its nest.

FIG. 5 is a cross sectional view of one embodiment of a container seated in its nest.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
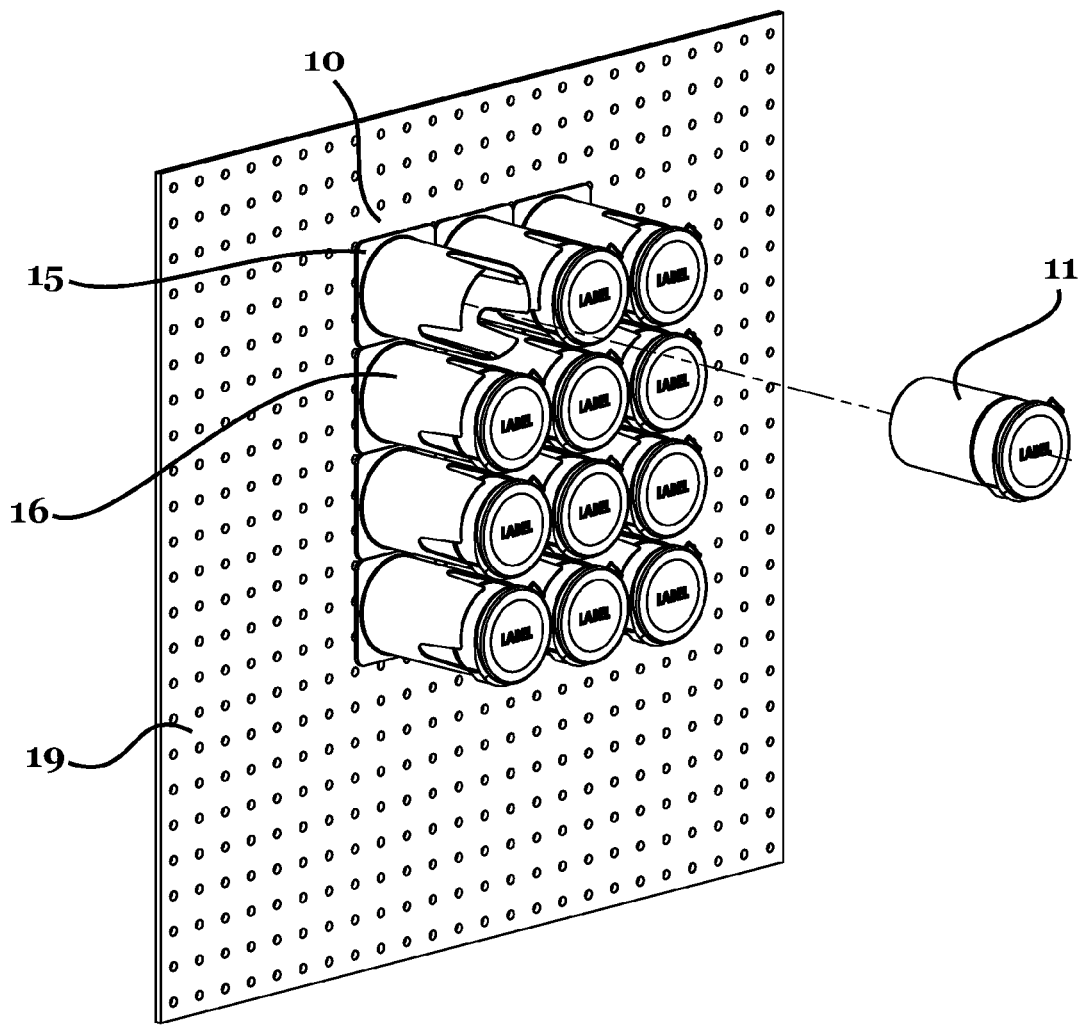
FIG. 1 is a perspective view of one embodiment of the invention with one container removed from a pegboard array.

Turning first to FIG. 1, there is shown a perspective view of one embodiment of the invention with one container removed from a pegboard array. A user configurable array of containers and nests (10) is shown installed onto a pegboard (19). Each sealable container (11) is seated in its own container nest (16). Each mounting flange (15) has been anchored to a pegboard (19) and there is a container nest (16) anchored to the top of the mounting flange (15). The sealed container (11) which has been removed from one of the nests (16) is shown extending outward from its nest. The containers are circular in the preferred embodiment but they can have any number of sides or surfaces.

Figure 2:
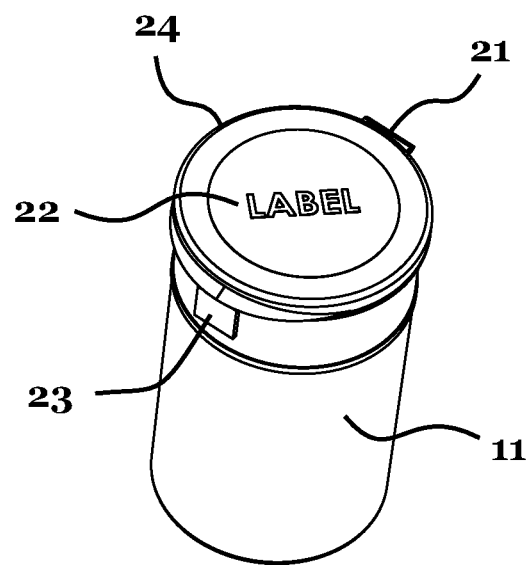
FIG. 2 is a perspective view of one embodiment of a container removed from its nest on a pegboard array.

FIG. 2 is a perspective view of one embodiment of one of the containers (11) removed from its nest on a pegboard. A resealable lid (24) connected by a hinge means (21) is anchored to the body of the container (11) and can be snapped shut with a container lid latch (23). An optional label (22) can be placed on the top of the resealable lid (24).

FIG. 3 is a perspective view of one of the containers seated in its nest (16) which has been removed from the array and is no longer attached to the pegboard. The mounting flange (15) can be seen with pegboard retention hooks (14) protruding from the top rear of the mounting flange (15). The nest (16) anchored to the opposite side of the mounting flange (15) holds the sealable container (11). The nest (16) has a number of catches on its interior surface which grip the container catch rib (13) which occurs around the outer circumference of the resealable container (11). The container lid hinge (21), the optional label (22), the resealable lid (24), and the container lid latch (23) can also be seen in FIG. 3.

FIG. 4 is an elevational view of one embodiment of a nested container in its nest looking directly toward the resealable lid (24). The mounting flange (15), the optional label (22) and the container lid hinge (21) can also be seen.

FIG. 5 is a cross-sectional view of one embodiment of a container seated in its nest. A retention hook (14), the shear load support post (17), and the retention barb (18) extending from the bottom of the mounting flange (15) are all clearly visible.

One possible approach in the preferred embodiment shown is to configure the invention so that the mounting flange (15) can be anchored vertically along a vertical mounting plane (27) as shown.

In this figure the container nest (16) can be shown with the container catch snaps (12) which are normally hidden inside the container nest (16). In the preferred embodiment, there are three container catch snaps (12) but any plurality of catch snaps may be used.

The container catch rib (13) that is radially proud of the container wall and extends around the full circumference of the container (11) is visible engaging the two container catch snaps (12) visible in FIG. 5.

The resealable lid (24) and the container lid latch (23) can also be seen.

Figure 6:
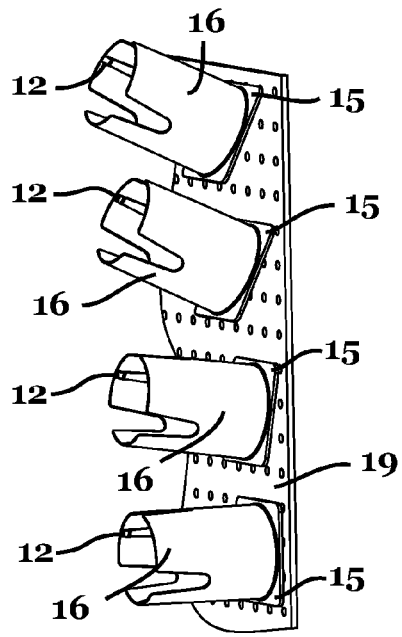
FIG. 6 is a perspective view of one embodiment of three nests in various stages of being anchored to a pegboard backing.

FIG. 6 is a perspective view of one embodiment of three nests in various stages of being anchored to a pegboard backing. Each container nest (16) can be seen with the container catch snap (12) visible on the inside of the nest (16). Also, the mounting flange (15) in various stages of being inserted into openings on a pegboard (19) can also be seen.

Figure 7:
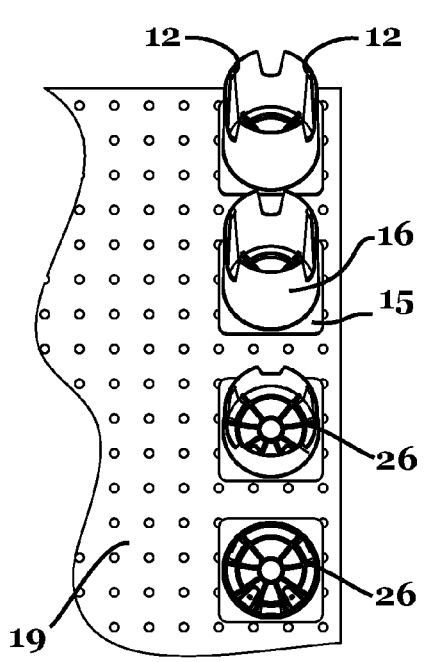
FIG. 7 is an elevation view of one embodiment of three nests in various stages of being anchored to a pegboard backing. One nest base is fully anchored to the pegboard backing with the container removed and is showing stiffening ribs on the mounting flange.

FIG. 7 is an elevation view of one embodiment of three nests in various stages of being anchored to a pegboard backing ("pegboard" and "backing" are equivalent terms). Two nests are shown in the process of being installed without containers and one nest is shown fully installed and also without a container so that stiffening ribs (26) on the mounting flange (15) are clearly visible. These stiffening ribs (26) are optional and can give added strength to the mounting flange (15) which has the container nest (16) anchored to the top of it. Also, container catch snaps (12) are also visible.

Figure 8:
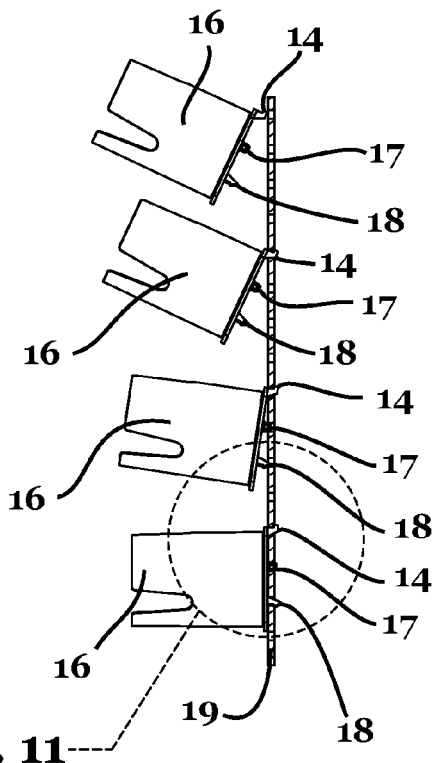
FIG. 8 is a side elevational view of one embodiment of three nests in various stages of being anchored to a section view of the pegboard backing.

FIG. 8 is an elevational view of one embodiment with three nests in various stages of being inserted into openings on a section view of the pegboard (19) similar to FIG. 6 which was a perspective view. The top nest is shown just prior to engaging retention hooks in the pegboard, the middle nest is shown with hooks engaged in the pegboard, and the bottom nest is shown with retention hooks, shear load support posts, and retention barbs fully engaged engaged and attached to the pegboard.

The retention barbs (18), the shear load support posts (17) and the retention hooks (14) can be seen at various stages of insertion onto a pegboard (19).

The container nests (16) anchored to the barbs, retention hook, and support posts via the mounting flange are also visible.

Figure 9:
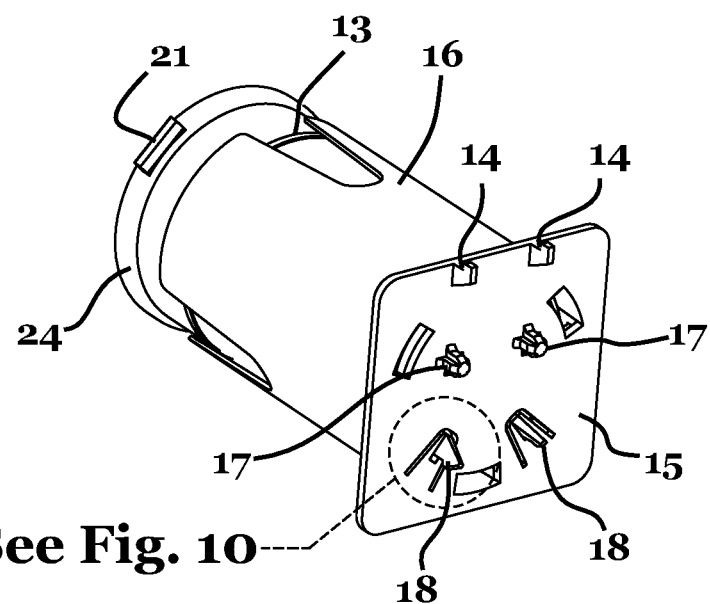
FIG. 9 is a perspective view of one embodiment of the back end of a mounting flange with a nest on the opposite side.
Figure 10:
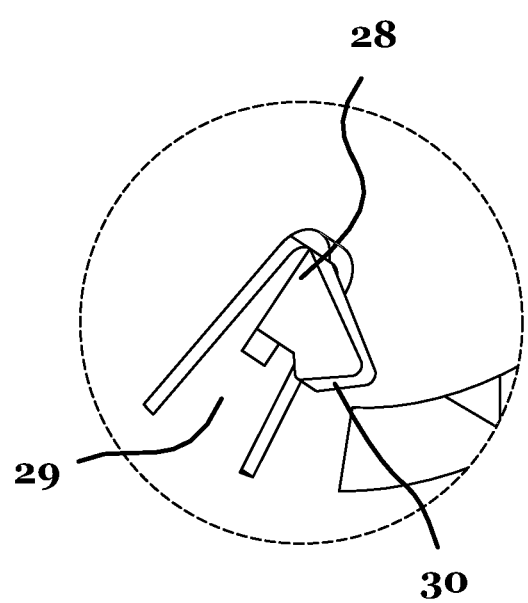
FIG. 10 is an enlarged portion of FIG. 9 showing a close up of a leading edge of a barb.
Figure 11:
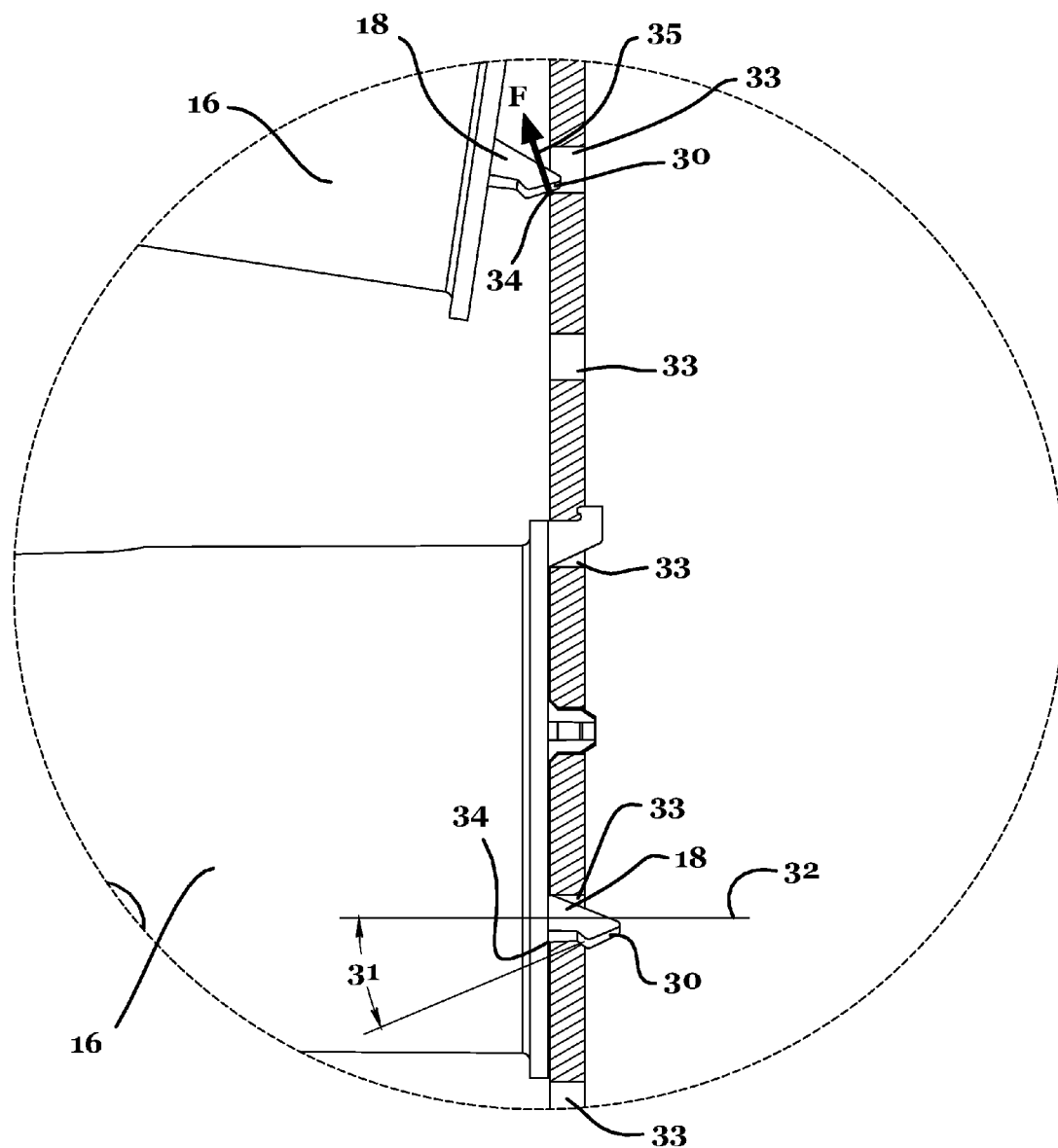
FIG. 11 is an enlarged portion of FIG. 10 showing a close up of backing openings and the leading edge of a barb inserted into a backing opening.

FIG. 9 is a perspective view of one embodiment showing the back end of a mounting flange with a nest on the opposite side. This shows in more detail the configuration of the retention hooks (14), the shear load support posts (17), and the retention barbs (18) which serve to anchor each container nest to a pegboard in this embodiment. FIG. 10 is an enlarged view of a circled portion of FIG. 9 showing a close up view of a retention barb (18) and the unsupported end (28) of a cantilevered beam (29) with its leading edge (30). FIG. 11 is an enlarged view of FIG. 8 showing in detail how the retention barb (18) on the container nest (16) is anchored on the unsupported end (28) of a cantilevered beam (29), each such retention barb (18) having a leading edge (30) positioned at an incline angle (31) relative to the horizontal axis (32) of the openings (33) in the backing (19) such that when each barb (18) is inserted into a backing opening (33) and first contacts the edge (34) of the opening (33) in the backing (19), a resultant vector of force (35) is created at the point of contact between the backing opening edge (34) and the leading edge (30) of the barb (18) where it makes point of contact with the opening in the backing (19). A vector of force (35) has a component of force along the horizontal axis of the nest and away from the direction of insertion creating a component of force perpendicular to the cantilevered beam (29) on which the barb (18) is anchored. This component of force causes the cantilevered beam (29) to deflect and to rotate the barb (18) toward the center of the opening (33) in the backing (19) it is being inserted into, thereby making insertion easier than removal.

In this embodiment of the invention, each retention barb (18) on the container nest is positioned at a sufficient incline angle relative to the horizontal axis of the pegboard holes such that when each barb (18) is inserted into a pegboard opening and first contacts the edge of the hole, a resultant vector of force is created at the point of contact between the pegboard opening edge and the leading edge of the barb (18). This vector of force has a component along the horizontal axis of the nest and away from the direction of insertion. This component of force is perpendicular to the cantilevered beam design which makes up the entire barb (18) structure and imparts a cam action against the barb (18) that tends to rotate the barb (18) toward the center of the opening it is being inserted into, thereby making insertion easier. When the barb (18) is fully inserted into the pegboard, the rear edge of the barb (18) is at a reverse incline angle that, in conjunction with the spring action of the cantilevered beam, serves the purpose of allowing the barb (18) and beam to accommodate variations in the diameters and sizes of the holes and the thickness of the pegboard. This incline angle on the rear edge allows for removal; however, any general force pulling the container nest away from the pegboard results in a force vector at the point of contact between the rear edge of the barb (18) and the pegboard opening edge that has a component of force along the horizontal axis in the opposite direction from the force applied during insertion. The component of force, as with insertion, is along the horizontal axis and perpendicular to the cantilevered beam structure upon which the barb (18) is located, but in contrast to insertion, the component of force is now in the opposite direction and resists flexure of the beam such that the barb (18) translates and rotates toward the pegboard and toward the edge of the opening thereby making removal more difficult. Given sufficient force pulling the container nest away from the pegboard, the combination of elastic and inelastic deflection of the plastic in the container nest and of the material of the pegboard with minor bending of the cantilevered beam structure, and translation and rotation of the position of the barb (18), permits removal of the container nest from the pegboard. The retention hooks (14), the shear load support posts (17), and the retention barbs configuration can be changed in number and location, so long as they continue to provide the anchoring necessary for the container nest. Also pegboard does not have to be specifically used, so long as the substrate upon which the nest is anchored has the necessary openings to anchor the hooks, shear load support posts and retention barbs.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A user configurable container storage system comprised of a movable container-nest module anchored to a backing, the container-nest module comprised of a:
    a mounting flange having a front side and a back side;
    a container nest being anchored to the front side of the mounting flange at one end and having an opening at the other end;
    a plurality of container catch snaps near the open end of the container nest;
    the mounting flange anchored to the container nest on the front side;
    the mounting flange having a plurality of retention barbs on the back side near one edge of the mounting flange spaced at positions that allows the retention barbs to fit into matching openings on the backing;
    the mounting flange having a plurality of retention hooks on the back side near the opposite edge of the mounting flange spaced at positions that allow the retention hooks to fit into matching openings on the backing;
    a container;
    a container catch rib projecting outward from the exterior surface of the container around the full circumference of the container; and
    the container catch rib positioned to engage the plurality of container catch snaps near the open end of the container nest when the container is inserted into the open end of the container nest.

2. The user configurable container storage system in claim 1 wherein each retention barb (18) on the container nest (16) is anchored on the unsupported end (28) of a cantilevered beam (29), each such retention barb (18) having a leading edge (30) positioned at an incline angle (31) relative to the horizontal axis (32) of the openings (33) in the backing (19) such that when each barb (18) is inserted into a backing opening (33) and first contacts the edge (34) of the opening (33) in the backing (19), a resultant vector of force (35) is created at the point of contact between the backing opening edge (34) and the leading edge (30) of the barb (18) where it makes point of contact with the opening in the backing (19);
    the vector of force (35) having a component of force along the horizontal axis of the nest and away from the direction of insertion creating a component of force perpendicular to the cantilevered beam (29)-on which the barb (18) structure is anchored; and
    said entire component of force causing the cantilevered beam (29) to deflect and to rotate the barb (18) toward the center of the opening (33) in the backing (19) it is being inserted into, thereby making insertion easier than removal.

3. The user configurable container storage system in claim 2 wherein when the barb is fully inserted into the backing, the rear edge of the barb closest to the backing is at a reverse incline angle that, in conjunction with the cantilevered beam, allows the barb and beam to accommodate variations in the sizes of the openings in the backing and the thickness of the backing.

4. The user configurable container storage system in claim 2 wherein the rear edge of the barb is at a reverse incline angle which allows for removal, any general force pulling the container nest away from the backing, resulting in a force vector at the point of contact between the rear edge of the barb closest to the backing that resists flexure of the beam where the barb rotates toward the pegboard and toward the edge of the opening in the backing thereby making removal more difficult than insertion.

5. The user configurable container storage system in claim 1 wherein the backing used is pegboard.

6. The user configurable container storage system in claim 1 wherein the mounting flange is oriented sideways with its base parallel to the flange and inserted horizontally into the container nest.

7. The user configurable container storage system in claim 1 wherein the container is oriented upright and inserted horizontally into the container nest.

8. The user configurable container storage system in claim 1 wherein there are three container catch snaps at the open end of the container nest.

9. The user configurable container storage system in claim 1 wherein the container contains a gripping means at one end with a lid for holding the container in the nest.

10. The user configurable container storage system in claim 1 wherein there are a plurality of container catch ribs extending outward from the exterior surface of the container around an exterior perimeter of the container, each container catch rib positioned to engage a plurality of container catch snaps at the open end of the container nest.

11. The user configurable container storage system in claim 1 wherein a plurality of container catch snaps at the open end of the container nest extend to the edge of the container lid so that the container catch snaps can snap over a lid on the container, thereby more securely closing the lid of the container.

12. The user configurable container storage system in claim 1 wherein the containers are cylindrical.

13. The user configurable container storage system in claim 1 wherein the containers are four sided.

14. The user configurable container storage system in claim 1 wherein the containers have a plurality of surfaces.

15. The user configurable container storage system in claim 1 wherein there are two retention barbs on the back side of the mounting flange near the bottom spaced at positions that allow the two retention barbs to fit into matching openings on the backing.

16. The user configurable container storage system in claim 1 wherein there are two retention hooks near the top of the mounting flange on the back side spaced at positions that allow the retention hooks to fit into matching openings on the backing.

17. The user configurable container storage system in claim 1 wherein the container has a lid.

18. The user configurable container storage system in claim 17 wherein the container has a means for anchoring the lid by a hinge.

19. The user configurable container storage system in claim 17 wherein the container has a latching means to close and seal the container.

20. The user configurable container storage system in claim 1 wherein a plurality of shear load support posts are attached on the back side of the mounting flange spaced at positions that allow the shear load support posts to fit into matching openings on the backing.

21. The user configurable container storage system in claim 20 wherein two shear load support posts are attached on the back side of the mounting flange spaced at positions that allow the mounting flange to fit into matching openings on the backing.

22. The user configurable container storage system in claim 1 wherein there are a plurality of container nests anchored to the front side of each mounting flange at one end, each container nest having an opening at the other end;
    a plurality of container catch snaps are present at the open end of each of the container nests;
    a plurality of containers; and
    a plurality of container catch ribs are positioned to engage the plurality of container catch snaps at the open end of each container nest.

23. The user configurable container storage system in claim 22 wherein there are four container nests anchored to the front side of each mounting flange at one end, each container nest having an opening at the other end.

\* \* \* \* \*